United States Patent [19]

O'Brian

[11] 3,899,135

[45] Aug. 12, 1975

[54] WATER EMITTER

[76] Inventor: Edward D. O'Brian, 1695 Crescent Ave., Anaheim, Calif: 92801

[22] Filed: Sept. 24, 1973

[21] Appl. No.: 400,019

[52] U.S. Cl. ............. 239/534; 137/525.1; 222/490; 239/562; 239/568
[51] Int. Cl. ............................................. A01g 27/00
[58] Field of Search .......... 239/534, 537, 538, 542, 239/547, 562, 563, 568, 597, 145, 266, 269, 450; 251/145; 137/525.1; 222/490; 61/12

[56] References Cited
UNITED STATES PATENTS

| | | | |
|---|---|---|---|
| 3,186,644 | 6/1965 | Ross et al. | 239/534 |
| 3,552,654 | 1/1971 | Thomas | 239/542 X |
| 3,662,955 | 5/1972 | Takanashi | 239/145 |
| 3,698,195 | 10/1972 | Chapin | 239/542 X |
| 3,736,755 | 6/1973 | Hammond et al. | 61/12 |

FOREIGN PATENTS OR APPLICATIONS 1,109,997  6/1961  Germany ............................ 239/538

*Primary Examiner*—M. Henson Wood, Jr.
*Assistant Examiner*—Andres Kashnikow

[57] ABSTRACT

A water emitter intended for agricultural use can be constructed so as to include an elongated, impervious, resilient tube having a plurality of spaced slits located along its length and a sleeve adjacent to each of said slits. The sleeves fit closely around the tube and are capable of being moved relative to the slits. The relative location between a sleeve and its associated slit determines or regulates the amount the slit will open in response to internal pressure within the tube. The sleeves also reinforce the tube so as to minimize or control the effects of temperature caused changes in the resiliency of the tube.

6 Claims, 3 Drawing Figures

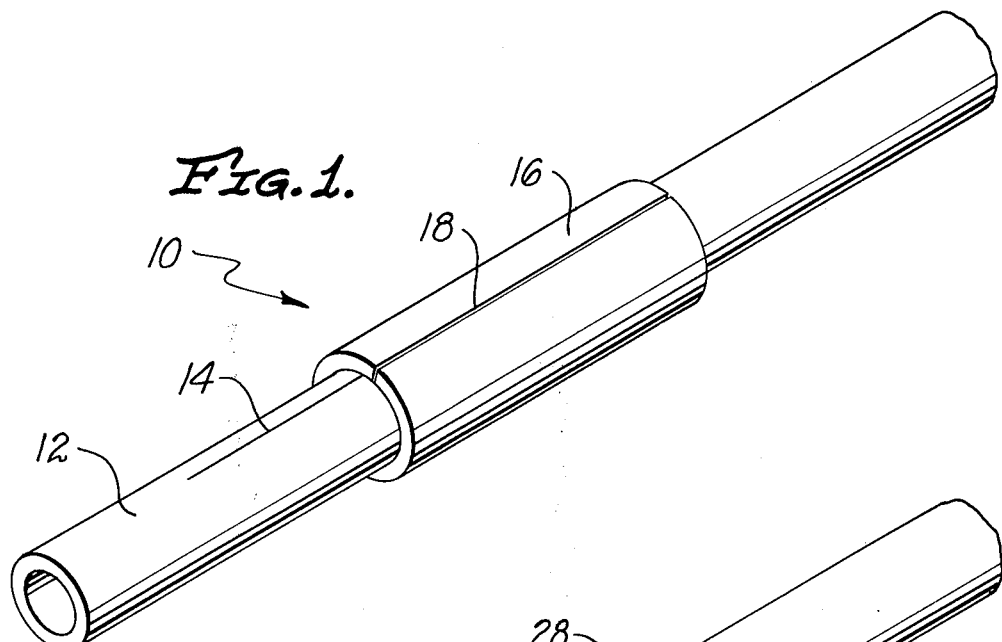
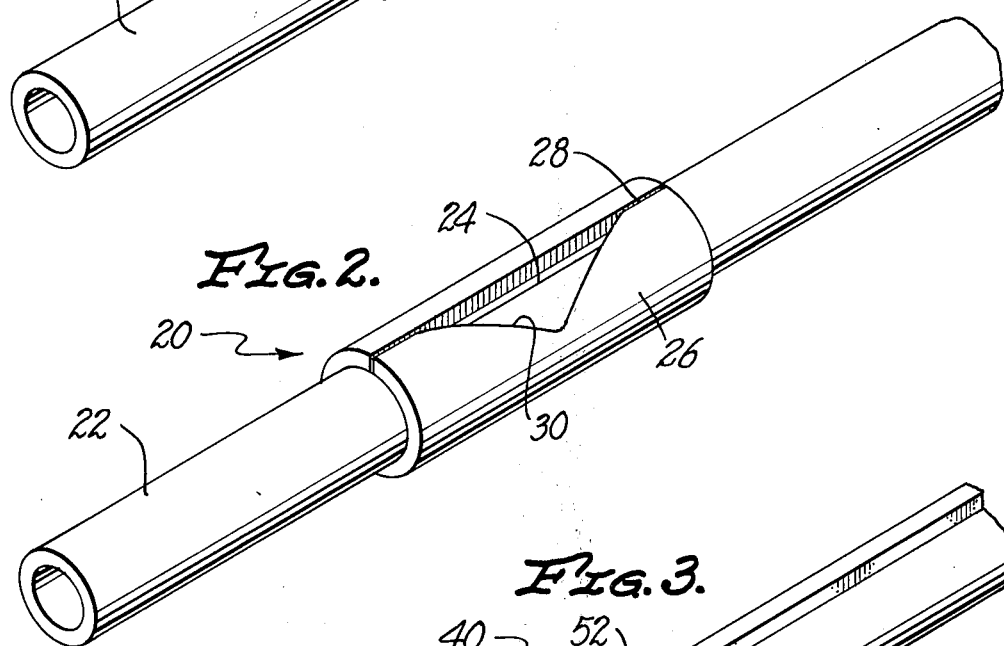
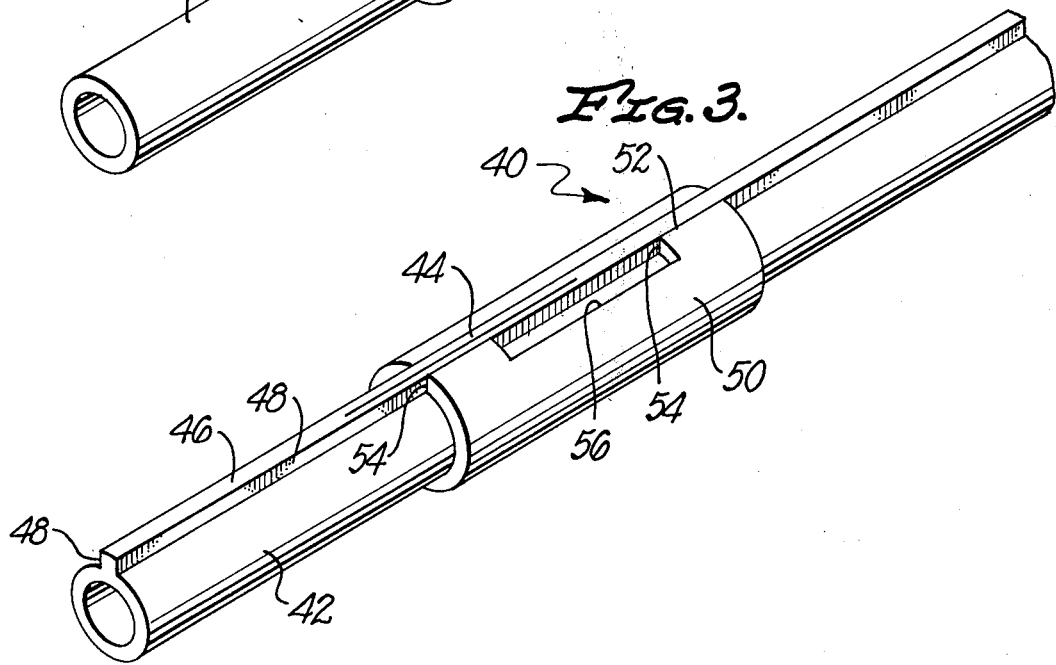

WATER EMITTER

BACKGROUND OF THE INVENTION

The invention set forth in this specification primarily pertains to water emitters such as are utilized for agricultural purposes in drip or similar irrigation. It is contemplated, however, that individual emitter structures within the scope of this invention will prove useful for other purposes.

The field of agricultural watering is growing in importance. At the present time classic methods of irrigation involving irrigation canals are normally considered to be relatively uneconomical in character. Similarly many individuals consider that agricultural sprinkler systems are uneconomical because of the costs involved with them. It is normally considered that there is a significant waste of water with both of these types of agricultural watering.

Because of the economics involved with classical ditch type irrigation and conventional sprinklers, the past decade has witnessed a significant increase in efforts to develop satisfactory emitter structures for so-called drip type agricultural watering. Watering of this type involves the emission of a limited or controlled amount of water in approximately the area where such water may be effectively utilized by one or more plants.

A number of so-called emitters have been developed for this purpose. Many of these units have been separate watering devices which are connected to an appropriate tube or conduit. Such separate devices are considered undesirable from a cost standpoint because of manufacturing costs and frequently because of the costs of installing them. As the field of agricultural watering has developed it has been recognized that it would be desirable to utilize the tubing used to convey water as an emitter. This has evolved a number of problems.

The water conveyed in a tube or conduit normally has to be above a minimal pressure for the water to adequately flow in such a tube or conduit. The water which can be emitted from such a tube or conduit on the other hand will be proportional or related to the pressure of the water within the tube or conduit. In other words, the higher the pressure of the water within a tube or a conduit in general the greater the amount of water which will flow through any sort of valve or opening in the tube or conduit.

As a consequence of this a number of structures have been proposed as either a part of or in association with a tube or a conduit in order to provide a pressure drop from the pressure within the tube or conduit before such water is dispensed to the ambient area. Such expedients have involved tortuous passages, interconnected tubes and the like. Although unquestionably structures such as are indicated in this paragraph are of a utilitarian nature, it is considered that there is a need for other structures which are more desirable than them.

An understanding of the present invention does not require a detailed analysis of all the reasons why this is considered to be the case, with certain prior structures it is considered that the need is related to the tendency for small holes or passages to become clogged with the sediment normally present in irrigation water. Not infrequently prior structures as indicated are disadvantageous because of difficulties in balancing the flow so the desired quantities of water are emitted at various points along the length of a long tube or conduit. With certain structures as indicated there are also manufacturing cost problems.

SUMMARY OF THE INVENTION

A broad objective of the present invention is to provide new and improved water emitters for use in drip type agricultural irrigation. A more specific object of the invention is to provide water emitters which are desirable from a cost standpoint. Another objective of the present invention is to provide water emitters which will function satisfactorily over a comparatively wide range of temperatures. An additional objective of the invention is to provide watering emitters which can be easily and conveniently adjusted so as to control water emission in a desired manner. A still additional objective is to provide water emitters which may be flushed using high pressure water so as to remove such accumulated material which might tend to interfere with their performance.

A water emitter in accordance with this invention is based upon a Bunsen valve having an elongated, resilient, imporous tube, the tube having a slit extending along the length thereof, the resiliency of the tube permitting the slit to open in response to internal pressure within the tube and automatically closing off the slit upon the cessation of such internal pressure, and includes the improvement which comprises a sleeve located around the tube adjacent to the slit, the sleeve being movable on the tube and fitting closely around the tube so as to be capable of being moved to a position relative to the slit to control the amount that the slit will open in response to internal pressure.

A structure of this type has a number of advantages in the agricultural watering field. Normally the resiliency of the tube used will vary with temperature. In an irrigated field frequently there will be significant temperature changes. With a preferred construction in accordance with the invention, the sleeve reinforces the tube adjacent to a slit as indicated so as to at least partially control the resiliency of the tube adjacent to the slit. This tends to minimize temperature caused performance variation.

BRIEF DESCRIPTION OF THE DRAWING

Further details of the invention set forth in this specification as well as many advantages of it will be apparent from a careful consideration of the remainder of this specification and the accompanying drawing in which:

FIG. 1 is an isometric view of an emitter structure in accordance with the invention used in an elongated tube containing a plurality of such structures spaced from one another along the length of the tube;

FIG. 2 is a view similar to FIG. 1 of a modified emitter structure in accordance with this invention; and FIG. 3 is a view similar to FIG. 1 of a further modified emitter structure in accordance with this invention.

The emitter structures illustrated in the drawing are various presently preferred embodiments or forms of emitter structures coming within the broad concepts of the present invention. It will be realized that for certain uses individual of these structures may be more desirable than the others. The concepts embodied within the illustrated structures are defined or summarized in the appended claims and may be utilized with other somewhat differently constructed emitters through the use or exercise of routine engineering skill or ability.

DETAILED DESCRIPTION

In FIG. 1 of the drawing there is shown an emitter 10 of the present invention formed so as to utilize a small part of the length of an elongated, resilient, imporous tube 12. A series of these emitters 10 may be located so as to be spaced from one another along the length of this tube 12. The tube 12 may be conveniently formed at a comparatively nominal cost by known extrusion techniques out of materials such as many conventional grades of polyolefins (especially many types of polyethylene), many resilient vinyl compositions and a number of other known polymers having physical properties as are herein indicated. An important feature of the invention is the fact that the wall of the tube 12 may be reasonably thin because this tube is of a seamless character without there being significant danger of the tube 12 bursting from the water pressure normally internally applied within it during use.

The emitter 10 includes an elongated slit 14 extending parallel to the axis of the tube 12 a reasonable distance along its length. When internal water pressure is applied within the interior of this tube 12 this slit 14 will open up because of the resiliency of the tube 12 so as to permit the escape of water. When the water pressure is decreased in the tube 12 the resiliency of this tube 12 will automatically cause the slit 14 to close up.

With the emitter 10 a tubular sleeve 16 is fitted closely around the exterior of the tube 12. Preferably the internal diameter of the sleeve 16 is such that it may be moved along the exterior of the tube 12 relative to the slit 14 either when the tube 12 is not expanded by virtue of internal water pressure or when the tube 12 is so expanded. The sleeve 16 should be dimensioned so that it will stay in place as a result of friction when it is moved to any position relative to the slit 14. This sleeve 16 may be formed of any convenient material such as polystyrene, steel, polyethylene or the like. Preferably, however, it is formed of material which is substantially unaffected by normal ambient temperature changes in the sense that the material does not soften or change to any significant degree in resiliency in response to such changes.

Within the emitter 10 the sleeve 16 may be adjusted along the length of the tube 12 relative to the slit 14 so that the sleeve 16 reinforces the tube 12 in such a way that the degree or amount that the slit can open is in part controlled by the position of the sleeve 16. This adjustability feature makes it possible to adjust the sleeves 16 used in individual emitters 10 along a long length of the tube 12 so that the amount of water emitted at any specific location is regulated. The sleeve 16 also serves to accomplish a degree of this regulation by reinforcing the tube 12 against temperature caused changes in the resiliency of this tube. So long as the sleeve 16 is not positioned over a slit 14 an emitter 10 can be flushed to remove accumulations by a relatively high internal water pressure. When the sleeve 16 is positioned so as to completely cover the slit 14 either a valve type or throttling type action will be achieved depending upon the closeness of the fit of the sleeve 16 around the tube 12. If the sleeve 16 fits very tightly around the tube 12 it will reinforce this tube 12 to such an extent that the slit 14 cannot open in response to internal pressure. If the fit of the sleeve 16 is not this tight the tube 12 will deform slightly in response to internal pressure so that a limited amount of water can seep through the slit 14. Such water will of course in this circumstance ooze or slowly flow between the tube 12 and the sleeve 16 to the ends of the sleeve.

In order to facilitate assembly of the emitter 10 the sleeve 16 may be formed with an elongated slot 18 extending along its length. If desired the slot 18 can be coiled along the length of the sleeve 16 in a coil spring like manner. Either type of slot 18 normally enables the sleeve 16 to be conveniently assembled upon a tube 12 by an operation involving temporary deformation of the sleeve 16. The slot 18, however, may also be used to control the amount that the slit 14 will open by being positioned opposite the slit 14.

This type of thing is effectively employed in the emitter 20 shown in FIG. 2 of the drawing. This emitter includes a tube 22, a slit 24, a sleeve 26—all as described in the preceding. It also includes a slot 28 having a triangular shaped internal opening 30 located intermediate the ends of the sleeve 26. This particular sleeve 26 provides reinforcement against temperature caused sagging of the tube 22 along the length of the slit 24. By rotating the sleeve 26 on the tube 22 it is possible to control the length of the slit 24 which can open in response to fluid pressure so as to achieve a valve type control.

In FIG. 3 of the drawing there is shown another modified emitter 40 which is designed so as to maximize the sealing area along the length of a tube 42 where a slit 44 is located. This tube 42 carries along its length an upstanding ridge 46 extending parallel to the axis of tube 42. The slit 44 is located in the ridge 46 so as to extend into the tube 42 between the sides 48 of this ridge 46. A sleeve 50 corresponding to the sleeve 16 and having a slot 52 extending parallel to its axis is located so as to fit closely around the tube 42 so that the walls 54 of the slot 52 engage the sides 48 of ridge 46. If desired the interior 56 of the slot 52 may be enclosed intermediate the ends of the slot 52 although this is not normally necessary.

With this structure the ridge 46 serves as an "indexing means" correlating the position of the slot 52 with respect to the tube 42. By regulating the position of the sleeve 50 relative to the slit 44 the length of this slit 44 which can be opened in response to internal pressure may be carefully controlled. Also because of the height of the ridge 46 and the pressure applied to the walls 44, the sealing area along the slit is maximized and may be correlated with respect to the amount that the slit 44 can open. Here again the sleeve effectively tends to combat temperature caused changes in the physical properties of the tube 42.

It is believed that it will be obvious to those skilled in the art of agricultural watering that the emitters shown are relatively inexpensive, easily manufactured structures which may be easily installed in a field and which may be easily adjusted so as to operate in a desired manner when so installed. Although the emitter structures as described are somewhat different from another it is considered they all employ the same mode of operation but that individual of these structures may be better for some applications than others.

I claim:

1. A water emitter having an elongated, resilient, imporous tube, the tube having a slit extending along the length thereof, the resiliency of the tube permitting the slit to open in response to internal pressure within the tube and automatically closing off the slit upon the cessation of such internal pressure in which the improvement comprises:

a sleeve located around the tube adjacent to the slit, said sleeve being moveable on the tube and fitting closely around the tube so as to be capable of being moved to a position relative to said slit to control the amount that said slit will open in response to internal pressure.

2. A water emitter as claimed in claim 1 wherein:

said sleeve has a slot formed therein and is capable of being placed on said tube so that said slot is over said slit so that the water emitted from said slit will pass through said slot.

3. A water emitter as claimed in claim 1 wherein:

said tube is formed of a thermoplastic material which changes in resiliency in response to temperature, and said sleeve reinforces said tube so as to control the resiliency of said tube adjacent to said slot.

4. A water emitter as claimed in claim 1 where:

said sleeve has a slot formed therein and is capable of being placed on said tube so that said slot is over said slit so that the water emitted from said slit will pass through said slot.

said tube is formed of a thermoplastic material which changes in resiliency in response to temperature, and said sleeve reinforces said tube so as to control the resiliency of said tube adjacent to said slot.

5. A water emitter as claimed in claim 1 wherein:

said tube includes an elongated projection formed along the length of said tube, said slit is in said projection and extends through said projection, said sleeve has a slot formed therein extending along the length of said tube, said sleeve engaging both sides of said projection and being moveable along the length of said projection relative to said slit.

6. A water emitter as claimed in claim 5 wherein:

said tube is formed of a thermoplastic material which changes in resiliency in response to temperature, and said sleeve reinforces said tube so as to control resiliency of said tube adjacent to said slot.

* * * * *